United States Patent
Bashir

(10) Patent No.: US 8,772,436 B2
(45) Date of Patent: Jul. 8, 2014

(54) PROCESS FOR MAKING THERMOPLASTIC POLYESTERS

(75) Inventor: Zahir Bashir, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 186 days.

(21) Appl. No.: 13/256,540

(22) PCT Filed: Mar. 15, 2010

(86) PCT No.: PCT/EP2010/001618
§ 371 (c)(1),
(2), (4) Date: Sep. 14, 2011

(87) PCT Pub. No.: WO2010/105787
PCT Pub. Date: Sep. 23, 2010

(65) Prior Publication Data
US 2012/0010382 A1    Jan. 12, 2012

(30) Foreign Application Priority Data

Mar. 18, 2009  (EP) .................................... 09003867

(51) Int. Cl.
*C08G 63/00* (2006.01)
*C08G 63/85* (2006.01)

(52) U.S. Cl.
CPC ...................................... *C08G 63/85* (2013.01)
USPC ........................................................ 528/279

(58) Field of Classification Search
CPC ...................................................... C08G 63/85
USPC ........................................................ 528/279
See application file for complete search history.

(56) References Cited

U.S. PATENT DOCUMENTS

| | | | |
|---|---|---|---|
| 3,962,189 A | 6/1976 | Russin et al. | |
| 4,064,112 A | 12/1977 | Rothe et al. | |
| 4,161,578 A | 7/1979 | Herron | |
| 5,656,716 A | 8/1997 | Schmidt et al. | |
| 5,684,116 A | 11/1997 | Martl et al. | |
| 6,034,203 A | 3/2000 | Lustig et al. | |
| 6,084,019 A | 7/2000 | Matayabas, Jr. et al. | |
| 6,143,837 A | 11/2000 | Al Ghatta et al. | |
| 6,372,879 B1 | 4/2002 | Dowling et al. | |
| 6,787,630 B1 * | 9/2004 | Dominguez De Walter et al. | 528/279 |
| 6,838,160 B2 | 1/2005 | Sasaki et al. | |

FOREIGN PATENT DOCUMENTS

| | | |
|---|---|---|
| EP | 1460166 A1 | 9/2004 |
| EP | 1585779 B1 | 3/2010 |
| JP | 52062398 A | 5/1977 |
| JP | H11099519 A | 4/1999 |
| JP | 2000119383 A | 4/2000 |
| JP | 2003253563 A | 9/2003 |
| JP | 2006218420 A | 8/2006 |
| JP | 2008037835 A * | 2/2008 |
| WO | 9518839 A1 | 7/1995 |
| WO | 2008082480 A1 | 7/2008 |

OTHER PUBLICATIONS

English Translation of JP 2008-037835A. Obtained at http://www19.ipdl.inpit.go.jp/PA1/cgi-bin/PA1DETAIL on May 15, 2013.*
Japanese Patent No. 2000119383 (A); Publication Date: Apr. 25, 2000; Abstract Only; 1 Page.
Japanese Patent No. 2006218420 (A); Publication Date: Aug. 24, 2006; Abstract Only; 1 Page.
Japanese Patent No. 2008037835 (A); Publication Date: Feb. 21, 2008; Abstract Only; 1 Page.
Japanese Patent No. 52062398 (A); Publication Date: May 23, 1977; Abstract Only; 1 Page.
International Search Report; International Application No. PCT/EP2010/001618; International Filing Date: Mar. 15, 2010; Date of Mailing: Jul. 5, 2010; 4 Pages.
Written Opinion of the International Searching Authority; International Application No. PCT/EP2010/001618; International Filing Date: Mar. 15, 2010; Date of Mailing: Jul. 5, 2010; 4 Pages.
Japanese Patent No. 2003253563 (A); Publication Date: Sep. 10, 2003; Abstract Only; 1 Page.
Japanese Patent No. H11099519 (A); Publication Date: Apr. 13, 1999; Abstract Only; 2 Pages.

* cited by examiner

*Primary Examiner* — Ling Choi
*Assistant Examiner* — Lanee Reuther
(74) *Attorney, Agent, or Firm* — Cantor Colburn LLP

(57) ABSTRACT

The invention relates to a process for making a thermoplastic polyester, which comprises contacting at least one carboxylic acid-based compound and at least one alcohol-based compound in esterification and subsequent polycondensation reactions, in the presence of certain exfoliated inorganic nano-layered titanates acting as a catalyst.

17 Claims, No Drawings

US 8,772,436 B2

PROCESS FOR MAKING THERMOPLASTIC POLYESTERS

CROSS REFERENCE TO RELATED APPLICATIONS

This application is a 371 of International Application No. PCT/EP2010/001618, filed Mar. 15, 2010, which claims priority to European Application No. 09003867.0, filed Mar. 18, 2009, both of which are hereby incorporated by reference in its entirety.

TECHNICAL FIELD

The invention relates to a process for making a thermoplastic polyester by contacting at least one carboxylic acid-based compound with at least one alcohol-based compound in esterification and subsequent polycondensation reactions, in the presence of a titanium-based catalyst.

BACKGROUND

Thermoplastic polyesters are essentially linear polymeric molecules containing in-chain ester groups, and are known to be truly versatile materials, being commonly used as fibers, plastics and films; in composites and elastomers; and as coatings. The production of polyesters by condensation of polyfunctional carboxylic acids with polyfunctional alcohols (or their ester-forming derivatives) is well known in the art, and is e.g. described in Encyclopaedia of Polymer Science and Engineering, $2^{nd}$ ed, volume 12, John Wiley and Sons, New York (1988).

The most commonly used polyester is polyethylene terephthalate (PET). The first PET production in 1940's employed dimethyl terephthalate (DMT) and monoethylene glycol (EG) as precursors. However, most production plants currently use pure grade terephthalic acid (PTA) and monoethylene glycol (EG) as raw materials, because of process economic reasons. In this case, first a low molecular weight prepolymer is formed by esterification of PTA with EG to form diethyleneglycol terephthalate and oligomers (DGT), with water as the main by-product being distilled off (step 1). This step is generally self-catalysed, but may be accelerated by adding catalyst. DGT is further subjected to polycondensation by transesterification and esterification reactions to form higher molecular weight polyester (step 2). Towards the end of polycondensation, transesterfication reactions become dominant. In this step, DGT is heated to about 280° C. under high vacuum to carry out the melt-phase polycondensation reaction with removal of the reaction byproducts, namely EG and water. Because transesterification is a slow reaction, the polycondensation step is generally catalysed. This catalyst can be added in step 2, but it can also already be included in step 1. The melt is discharged and chipped after it has reached desired molecular weight values, reflected by intrinsic viscosity (IV) values.

Industrial-scale PET production is generally based on a continuous PTA system employing several reactors in series, as described for example by S. M. Aharoni in "Handbook of Thermoplastic Polyesters", vol. 1, chapter 2, Editor S. Fakirov, Wiley-VCH, 2002; and by V. B. Gupta and Z. Bashir in "Handbook of Thermoplastic Polyesters", vol. 1, chapter 7, Editor S. Fakirov, Wiley-VCH, 2002. This system uses a vessel in which EG, PTA, catalyst and additives are mixed; one or two esterification reactors; one or two pre-polycondensation reactors, followed by a high-vacuum finisher reactor for the final stages of polycondensation. The polyester formed may be extruded into filaments, quenched under water and cut to form amorphous chips.

PET is mainly used in industry for production of textile fibers, filaments, films and bottle grade chips. PET used in film and fiber applications typically has an IV in the range of 0.58 to 0.64 dL/g; PET films and fibers can be produced directly by extruding the melt from the poycondensation reactor. For PET bottle grade resin, polymers with IV in the range of 0.75 to 0.85 dL/g, and with low residual acetaldehyde are generally required. In this case, a split process is used to attain this IV value while minimising the amount of acetaldehyde. The general practice is to make polymer chips with an intermediate IV of about 0.63 dL/g by melt polycondensation, and then increase the IV to about 0.75 to 0.85 dL/g by subsequent solid-state polycondensation (SSP). This split procedure allows production of a high IV resin with minimal quantities of acetaldehyde, which is a degradation by-product that may affect the taste of beverages packed in PET bottles. Diethylene glycol (DEG) is a diol generated from ethylene glycol via a side reaction and is also incorporated in the PET chain. Presence of DEG as comonomer reduces the glass transition and melting temperature of the PET, and too high levels are undesirable. The melt phase and SSP technology is described for example by V. B. Gupta and Z. Bashir, in "Handbook of Thermoplastic Polyesters", vol. 1, chapter 7, Editor S. Fakirov, Wiley-VCH, 2002.

The catalysts currently employed in industrial PET production are catalysts generally based on antimony (Sb), mostly antimony triacetate or antimony trioxide. A disadvantage of using antimony-based catalyst compounds is the greyish color of PET that results from partial precipitation of antimony metal. Moreover, antimony is rather expensive and it shows some environmental concerns. Also, the usage of germanium dioxide as catalyst is limited due to its high cost because of scanty reserves, though this catalyst gives polyesters with good clarity. Various titanium (Ti) based compounds have also been proposed as polycondensation catalysts, because they are relatively inexpensive and safe. Described titanium-based catalysts include tetra-n-propyl titanate, tetraisopropyl titanate, tetra-n-butyl titanate, tetraphenyl titanate, tetracyclohexyl titanate, tetrabenzyl titanate, tetra-n-butyl titanate tetramer, titanium acetate, titanium glycolates, titanium oxalates, sodium or potassium titanates, titanium halides, titanate hexafluorides of potassium, manganese and ammonium, titanium acetylacetate, titanium alkoxides, titanate phosphites etc.

Documents EP0699700, U.S. Pat. No. 3,962,189 and JP52062398 describe production of polyesters using Sb-free Ti-based catalyst compositions, optionally containing Mn—, Co—, P— and/or other compounds. The colour of the obtained polyester generally shows a yellowish colour, and relatively high amounts of acetaldehyde and cyclic by-products are formed.

U.S. Pat. No. 6,372,879 describes polyester polycondensation in the presence of a Ti-based catalyst and a catalyst enhancer. The composition comprises titanyl oxalate catalyst consisting of a combination of lithium or potassium titanyl oxalates with Sb-trioxide, -triacetate or -triglycoxide; a metallic oxalate catalyst enhancer; and optionally, Sb-based co-catalyst.

U.S. Pat. No. 6,143,837 discloses a process for preparation of polyester resins using Ti alkoxides, acetylacetonates, dioxides and phosphites. Though the Ti-catalyst is about four times more active than Sb-catalyst, in order to reduce yellow coloration in the polyester cobalt compounds and other organic colorants were added. Also dianhydride of an aromatic tetra carboxylic acid was added to compensate for the low reactivity of the Ti-based catalyst towards solid-state polycondensation (SSP); a disadvantage being that this addition leads to branching.

Titanium glycolates are also described as a catalyst for PET in R. Gutman, Textile Praxis International 1, 1989, 29-33, and EP1585779. Disadvantages include tendency for yellowing, and reduced activity in SSP.

U.S. Pat. No. 6,034,203 discloses a process to produce polyesters in the presence of a catalyst having the formula $M_xTi^{(III)}{}_yTi^{(IV)}{}_zO_{(x+3+4y)/2}$, wherein M is an alkali metal, $Ti^{(III)}$ is Ti in +3 oxidation state, $Ti^{(IV)}$ is Ti in +4 oxidation state, x and y≥0, and when x=0, then y<½. $Ti_2O_3$ and $Li_xTiO_2$ were employed in the examples as catalysts; PET obtained with these catalysts shows yellowing.

WO95/18839 discloses a production process for polyesters wherein specific $TiO_2/SiO_2$ or $TiO_2/ZrO_2$ co-precipitates are applied as catalyst, showing higher activity then Sb-based systems.

EP0736560 discloses also titanate catalysts of formula $(Me_nO)_x \cdot (TiO_2)_y \cdot (H_2O)_z$, wherein Me is an alkaline earth or alkali metal, and having specific particle size for production of polyesters.

JP2000119383 discloses a process to manufacture polyesters by using a nano-sized titanium dioxide as polycondensation catalyst, with particle size of 100 nm or less and a specific surface area of 10 m²/g or more. The activity of this catalyst is comparable with the activity of an antimony catalyst; however aggregation of nano crystals is generally difficult to avoid and this would result in residual haze in the polymer, as $TiO_2$ has a very high refractive index compared to the polymer.

The majority of commercial PET production is still based on Sb-catalysts, and there thus remains a need in industry for a process for making polyesters that uses more environmentally friendly catalysts, with high productivity in melt-phase and/or solid-state polycondensation and low amount of side reactions, which provides polyester articles with good transparency and colour.

SUMMARY

The object of the invention is therefore to provide such an improved process.

This object is achieved according to the invention with a process, which comprises contacting at least one carboxylic acid-based compound and at least one alcohol-based compound in esterification and subsequent polycondensation reactions, in the presence of an inorganic nano-layered titanate in exfoliated form as a catalyst.

DETAILED DESCRIPTION

It is surprising that in the process according to the present invention a nano-layered titanate acts as a polycondensation catalyst for making a polyester, because prior art did not hint to such properties. In addition, it is surprising that for some selected nano-layered titanates no separate pre-treatment of the titanate is needed for such catalytic activity, because an extra step of chemical treatment is conventionally described in the literature as being necessary to separate or exfoliate the titanate into nano-layers.

U.S. Pat. No. 6,838,160 also discloses nano-layered titanates, but this document describes using nano-layered titanate to prepare a multi-layered composite consisting of alternatingly assembled layers of the titanate and a polymer substrate; and it suggests employing the ultra-thin titanate multilayer composite formed as an ultraviolet shield coating of a window material; as a thin film for photoelectric conversion; as a photochromic material, and as a photocatalyst thin film and sensor. It is also true that document U.S. Pat. No. 6,084,019 discloses the addition of clays, which are layered minerals that can be exfoliated into nano-layers, during melt polycondensation of PTA and EG to result in PET with improved gas barrier properties. However, this document does not disclose or suggest any catalytic benefit of such exfoliated clay materials. In fact, U.S. Pat. No. 6,084,019 indicates that the melt polycondensation rate is lowered by addition of clay nanosheets, because they act as a barrier to the diffusion of the reactant by-products such as EG.

In the process according to the invention thermoplastic polyester is understood to be substantially linear polyester, optionally having some degree of chain branching, which polyester can be melt-processed into shaped articles.

In the process according to the invention the carboxylic acid-based compound may be a carboxylic acid or an ester-forming derivative thereof, like an ester, especially an alkyl- or hydroalkyl-ester, or acid chloride. Preferably, a dicarboxylic acid of the formula HOOC—R—COOH, wherein R is a—linear or branched—alkyl group, an arylene group, an alkenylene group, or a combination thereof is used as carboxylic acid-based compound. Preferably, R has about 2 to 30, preferably about 4 to 15 carbon atoms. Suitable examples of carboxylic acid compounds may include saturated aliphatic dicarboxylic acids such as oxalic acid, malonic acid, succinic acid, gluratic acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimeric acid; unsaturated aliphatic dicarboxylic acids such as fumaric acid, maleic acid, and itaconic acid; and aromatic dicarboxylic acid such as orthophthalic acid, isophthalic acid, terephthalic acid, 5-(alkali metal)sulfoisophthalic acid, diphenic acid, 1,3-naphthalenedic arboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4,-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid. Other dicarboxylic acids, and minor amounts of polycarboxylic acids or hydroxycarboxylic acids may also be used as constituent components.

More preferably, the carboxylic acid-based compound is at least one compound selected from the group consisting of terephthalic acid, isophthalic acid, naphthalenic diacid, succinic acid, adipic acid, phthalic acid, glutaric acid, oxalic acid, and maleic acid. Most preferably, the carboxylic acid compound is terephthalic acid.

The alcohol-based compound may be a hydroxy-functional compound or an ester-forming derivative thereof, like an ester of a lower aliphatic carboxylic acid, such as acetic acid. Preferably, the alcohol-based compound is a bi-functional alcohol, like an alkylene glycol of the formula HO—R'—OH, a polyalkylene glycol having the formula HO—[R'—O—]$_n$—H, or combinations thereof, wherein R' is an alkylene group, linear or branched, having 2 to about 10, preferably 2 to 4 carbon atoms, and wherein R", being the same or different, is an alkylene group having 1 to about 10, preferably 1 to 5 carbon atoms. Suitable examples of the alcohol-based compound include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, and polytetramethylene glycol; and aromatic glycols such as hydroquinone, 4,4'-dihydroxybisphenol, 1,4-bis(β-hydroxyethoxylbenzene, 1,4-bis(β-hydroxyethoxyphenyl)sulfone, bis(p-hydroxyphenyl) ether, bis(p-hydroxyphenyl)sulfone, bis(p-hydroxyphenyl) methane, 1,2-bis(p-hydroxyphenyl)ethane, bisphenol A, bisphenol C, 2,5-naphthalenediol, and glycols obtained by adding ethylene oxide to these glycols. Preferably, the alcohol-based compound is at least one compound selected from the group consisting of ethylene glycol, 1,3-propylene glycol, 1,4-butylene glycol, and 1,4-cyclohexanedimethanol. More preferably, ethylene glycol is used in the process according to the invention.

Small amounts of polyhydric alcohols may also be used in combination with these glycols. Suitable examples of polyhydric alcohols are trimethylolmethane, trimethylolethane, trimethylolpropane, pentaerythritol, glycerol, and hexanetriol. The hydroxycarboxylic acids may also be used in combination. Examples of hydroxycarboxylic acids may include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid and their ester-forming derivatives. Also, cyclic esters in combination may be used in present invention. Examples of cyclic esters include ε-caprolactone, (β-propiolactone, (β-methyl-(β-propiolactone δ-valerolactone, glycollide, and lactide.

In the process of the present invention, the initial molar ratio of the dicarboxylic acid-based compound and the diol-based compound may be in the range of about 1:1 to about 1:3, preferably 1:1.2 to 1:2. Optimum ratio generally depends on reaction temperatures and time.

The polyester of the present invention preferably is a polyethylene terephthalate (PET), polybutylene terephthalate (PBT), polypropylene terephthalate, poly(1,4-cyclohexanedimethylene terephthalate), polyethylene naphthalate (PEN), polybutylene naphthalate, polypropylene naphthalate, and their copolymers, and among them, polyethylene terephthalate and its copolymers are particularly preferred. Preferred are copolymers that contain at least 50 mol % and preferably at least 70 mol %, or even at least 80, 90, 95 or 98 mol % of the ethylene-terephthalate repeating units.

Any suitable comonomer may be optionally added in the process according to the invention, such as isophthalic acid, cyclohexane dimethanol or mixtures thereof. Preferably, isophthalic acid is added in the process of the invention. Said comonomers may be added in an amount of up to about 25 mol %, preferably about 1-10 or 1-5 mol %, to control the processing and crystallisation behaviour of the polyester, and properties of articles made there from, such as the transparency.

The term titanate is broadly used for both organic and inorganic compounds. Organic titanates are titanium alkoxides of the formula Ti(OR)$_4$, for example titanium butoxide. These compounds can be used as catalysts for PET, however, they react with water produced in the reaction and convert to Ti(OH)$_2$ and/or TiO$_2$; deactivating the catalyst and causing haze in the polymer. The literature also uses the term titanates for various titanium oxides containing further elements like H, alkali metals, and also certain metals such as niobium. These can be regarded as inorganic titanates, and are generally made by reaction of various reagents with TiO$_2$.

Within the context of the present application, an inorganic nano-layered titanate is understood to mean a compound that contains titanium, oxygen, hydrogen, and optionally other metals, and which has a layered structure being made of a plurality of layers, or nano-sheets, each layer having a size in the range of from 1-2 nm. The Ti and O are covalently bonded to form nano-layers and the hydrogen and/or the metal, for example alkali metal, resides in the interlayers (also called galleries). The layers form macro-anions and the H (or alkali metal) provides charge compensation. For this class of nano-layered metal oxides, the crystal plates may be microns in size, but the covalently bonded planar sheet is about 1 nm thick, while the gallery spacing is also about 1 nm Within the context of the present application, an inorganic nano-layered titanate in exfoliated form is understood to mean that under esterification and/or polycondensation conditions—or more generally under polymerisation conditions—of the process according to the invention said titanate is at least partly present in the form of exfoliated layers, and acts as catalyst for the esterification and/or polycondensation reactions. An inorganic nano-layered titanate may be added to the process in non-exfoliated form, meaning that exfoliation will occur at least partly during said esterification and/or polycondensation reaction, but a titanate compound can also be added to the process of the invention in an already pre-exfoliated form; as will be described in more detail below.

There are many classes of layered inorganic compounds, typically the layers are bonded electrostatically by counter ions that reside in the galleries between layers, to form nano-layer stacks. Examples include smectite clays, vermiculites, alpha zirconium phosphate and mica. A relatively low layer charge-density with appropriate interlayer cation and solvent allows exfoliation—that is separation into nano layers—under certain conditions; while high charge density may make such exfoliation virtually impossible. For example, smectite clays such as montmorillonite can spontaneously exfoliate in water to give a colloidal dispersion of single nano-layers. At the other end of the spectrum mica, although layered, cannot be separated into a nano-layer dispersion, due to its high charge density. Other layered compounds such as alpha Zr(HPO$_4$)$_2$.H$_2$O and titanates of the formula H$_m$M$_n$O$_{2n+1}$ (M=Ti, Nb) do not spontaneously exfoliate in water. However, these compounds are solid Brønsted acids, hence they can undergo acid-base intercalation with basic compounds like alkali hydroxides or primary amines; under certain pH conditions the intercalated compounds may further exfoliate in water. Thus, the propensity of a nano-layered material to exfoliate will depend on the layer charge density, the crystal structure, the nature of the liquid medium, the pH and the temperature.

In layered compounds, for example in phyllosilicates (clays), the "layer charge" is the total negative charge deviation from an ideal, unsubstituted, dioctahedral or trioctahedral composition. Clays are generally of volcanic origin and hence often have 'defects' in the composition. For example, the layer composition in muscovite mica is ideally Al$_2$Si$_4$O$_{10}$(OH)$_2$, but if Al$^{3+}$ substitutes as an impurity at a Si$^{4+}$ site, the layer composition becomes Al$_2$(Si$_3$Al)O$_{10}$(OH)$_2$ and a residual charge of −1 in the layer results. In muscovite mica, this residual charge is compensated by an interlayer cation, K$^+$, so that the structure is overall charge-neutral. Due to the O$_{10}$(OH)$_2$ anion framework in the layer, layer charges are negative, and the charge compensation relies on cations.

As with alumino silicate clays, isomorphous inorganic titanate compounds may be made by substituting Ti with a lower valent cation like $Mg^{2+}$, an example being $Cs_xTi_{2-x/2}Mg_{x/2}O_4$. Alternatively, layer charge may arise from Ti vacancies in the titanate; this is the case with $Cs_xTi_{2-x/4}\square_{x/4}O_4$, where $\square$ denotes a missing Ti atom in the lattice, and x=0.7.

For determining the layer-charge density (LCD) in nano-layered materials like clays, the two most common techniques are: 1) Structural formula method (SFM), involving calculation of the structural formula based on the chemical composition, and 2) Alkyl ammonium method (AAM), which is based on measuring the d-spacing after intercalation of a set of n-alkylammonium ions.

These methods are reviewed by S. Kaufhold in Applied Clay Science 34 (2006), pp 14-21; and by A. Czímerová et al. in Applied Clay Science 34 (2006), pp 2-13. Choice of most appropriate method and result appear to be a.o. dependent on type of material.

Similar methods are also used to determine layer charge-density in layered titanates. Realising that different methods may lead to different results, the method and results reported by Sasaki et al. are used for specifying the layer-charge density of titanates in this invention (see 'Comparison of Protonic Titanates with the Lepidocrocite-Type Layered Structure,' in Chem. Mater., 1998, 10, pp 4123-4128, and "Preparation and Acid-Base Properties of a protonated Titanate with Lepidocrocite-like Layer Structure", in Chem. Mater., 1995, 7, pp 1001-1007).

In principle, any nano-layered titanate that can be exfoliated can be used as a catalyst for PET in the process according to present invention. Exfoliation may be achieved and demonstrated in several ways, for example by treating the layered titanate with a solution (aqueous or non-aqueous) of a basic compound; and forming a liquid suspension of at least partly separated nano-layers.

In a preferred way of operating the process according to the invention, the inorganic nano-layered titanate has been added in pre-exfoliated form. A nano-layered titanate can be made into pre-exfoliated form by a chemical or physical treatment, or by a combination thereof.

The preferred method of exfoliation will depend on the layer charge-density of the titanates. Sasaki et al. (Chem. Mater. 1995, 7, pp 1001-1007) indicate that the layer charge-density for some layered titanates and other layered compounds shows the following trend: smectite clays<$H_{0.7}Ti_{1.825}\square_{0.175}O_4 \cdot H_2O$<$H_2Ti_5O_{11} \cdot 3H_2O$<$H_2Ti_4O_9 \cdot 1.2H_2O$<$H_2Ti_3O_7$<zirconium phosphates<micas. The exfoliation tendency will show a similar order. The layered titanate $H_{0.7}Ti_{1.825}\square_{0.175}O_4 \cdot H_2O$, for example, will not exfoliate in water but Sasaki et al. show that exfoliation occurs in an aqueous medium containing tetrabutyl ammonium hydroxide (Journal of the American Chemical Society 118 (1996), pp 8329-8335). Likewise, the layered titanate $H_{1.07}Ti_{1.73}O_4$ derived from the mixed alkali-metal titanate $K_{0.8}Ti_{1.73}Li_{0.27}O_4$ exfoliates in aqueous tetrabutyl ammonium hydroxide (see T. Tanaka et al., Chem. Mater., 2003, 15, pp 3564-3568; T. Nakato, Thin Solid Films Volume 495, 2006, pp 24-28). Other titanates with relatively high layer charge density such as $Na_2Ti_3O_7$ and $H_2Ti_3O_7$, $H_2Ti_5O_{11} \cdot 3H_2O$, $H_2Ti_4O_9 \cdot 1.2H_2O$, and $H_2Ti_3O_7$ will not exfoliate in water or aqueous tetrabutyl ammonium hydroxide. However, some of these can be made to exfoliate under more severe conditions. For example, $Na_2Ti_3O_7$ and $H_2Ti_3O_7$ can be exfoliated in concentrated aqueous NaOH at temperatures between 100° C. to 170° C.

In case the layered titanate has been pre-exfoliated in an aqueous medium with a basic compound like tetrabutyl ammonium hydroxide, the suspension obtained may be added to the PTA-EG slurry at the start of the polymerisation process for making PET. However, nitrogen containing basic compounds like amines are less suited in a process for making polyesters like PET, in view of undesired colour formation during polymerisation. Adding the obtained slurry is preferred over washing and drying to remove e.g. added basic compound, because the layers may then re-stack in a manner similar to the original titanate. Preferably, the layered titanate has been pre-exfoliated by treatment with an ammonium hydroxide compound, or an alkali hydroxide compound.

In case of titanates with higher layer charge-density such as $H_2Ti_3O_7$, $H_2Ti_5O_{11} \cdot 3H_2O$ or $H_2Ti_4O_9 \cdot xH_2O$, which require more severe conditions for exfoliation such as treatment in concentrated aqueous NaOH at temperatures between 100° C. to 170° (hydrothermal synthesis method), there is a strong tendency for the exfoliated layers to scroll into titanate nanotubes. The suspension of titanate nanotubes obtained, may then be used as such, but is preferably filtered and washed to remove excess basic compound. Unlike titanate nanosheets, titanate nanotubes cannot restack on drying, so the dried or semi-wet fibrillar mass can be added as catalyst during the process of the invention.

In a further preferred way of operating the process according to the invention, the inorganic nano-layered titanate has a relatively low layer charge-density. More specifically, the inorganic nano-layered titanate has a layer charge-density in the range of about 2 to 4 $nm^{-2}$, as defined and given by Sasaki et al. in (the afore-mentioned publications) Chem. Mater., 1998, 10, pp 4123-4128, and Chem. Mater., 1995, 7, pp 1001-1007; hereinafter referred to as 'determined by the Sasaki method'. The advantage hereof is that the titanate may be added as a solid in non-exfoliated form to the polymerisation process according to the invention. Without wishing to be bound to any theory, the inventor believes that due to relatively weak electrostatic interlayer bonding these titanate materials can separate into nano-layers in the molten polymerisation medium, thus providing access for reactants to active Ti-sites that subsequently catalyse the esterification and especially the polycondensation reaction. This is surprising, because Sasaki et al. show that such layered titanates are only exfoliated in an aqueous solution of tetrabutyl ammonium hydroxide. In general, as the layered titanates are solid acids, the established literature states their delamination (if occurring at all) has to be induced by basic reagents. The polyester polymerisation medium, in case of PET starting with a PTA-EG slurry, is not basic, so it is not obvious that the layered titanate will exfoliate. Typically exfoliation of layered titanates with base is done either at toom temperature (with alkyl ammonium) or at 100-170° C. with aqueous NaOH. It might be speculated that the higher temperature attained in the polymerisation process (e.g. 250-280° C.) helps penetration of molecules (ethylene glycol, esters, oligomers) into the galleries, aiding exfoliation without the need for base.

Preferably, the charge density of the nano-layered titanate in the process according to the invention is at most 3.8, 3.6, 3.4 or 3.2 $nm^{-2}$, as determined by the Sasaki method.

These nano-layered titanate catalysts are environmentally friendly, show high activity in esterification reactions; short melt polycondensation times; high solid-state polycondensation rate, especially when used with an appropriate phosphorus compound; give high IV stability in the melt; and do not promote side reactions, i.e. the polyester shows for example relatively little acetaldehyde formation; and allows production of moulded articles with good transparency, as the exfoliated nano-layers do not cause significant increase in light scattering. An additional advantage is that -unlike organic titanate catalysts described in the literature- the exfoliated inorganic titanates do not become deactivated in the presence of water, and reaction rate is dependent on catalyst concentration.

Preferably, the inorganic nano-layered titanate catalyst is at least one member selected from the group consisting of lepidocrocite-type titanates of formula $H_xTi_{2-x/4}\square_{x/4}O_4 \cdot H_2O$, wherein x is in the range of 0.5 to 1 and $\square$ denotes a vacancy. This titanate has a relatively low layer charge density and exfoliates under mild conditions, for example aqueous tetrabutyl ammonium at ambient, and also in the polymerisation medium.

More preferably, the catalyst of present invention is a lepidocrocite-type titanate of formula $H_xTi_{2-x/4}\square_{x/4}O_4 \cdot H_2O$, wherein x is in the range of 0.67 to 0.73; $\square$ is a vacancy; this catalyst has the formula $H_{0.7}Ti_{1.825}\square_{0.175}O_4 \cdot H_2O$ when the mean stoichiometry x is about 0.7.

Sasaki et al., report in Chem. Mater., 1998, 10 (12), pp 4123-4128 on layer charge-densities of some titanates, which is partly represented in Table 1.

TABLE 1

| Titanate | charge density (nm$^{-2}$) |
| --- | --- |
| $H_{1.07}Ti_{1.73}O_4 \cdot H_2O$ | 4.72 |
| $H_{1.00}Ti_{1.75}O_4 \cdot H_2O$ | 4.41 |
| $H_{0.93}Ti_{1.77}O_4 \cdot H_2O$ | 4.11 |
| $H_{0.7}Ti_{1.825}\square_{0.175}O_4 \cdot H_2O$ | 3.11 |
| $H_{0.7}Ti_{1.65}Mg_{0.35}O_4 \cdot yH_2O$ | 3.10 |
| $H_{0.8}Ti_{1.6}Ni_{0.4}O_4 \cdot H_2O$ | 3.52 |
| $H_{0.8}Ti_{1.2}Fe_{0.8}O_4 \cdot H_2O$ | 3.52 |

The process of the invention thus preferably applies as titanate at least one member selected from the group consisting of $H_{0.7}Ti_{1.825}\square_{0.175}O_4 \cdot H_2O$, $H_{0.7}Ti_{1.65}Mg_{0.35}O_4 \cdot yH_2O$, $H_{0.8}Ti_{1.6}Ni_{0.4}O_4 \cdot H_2O$ and $H_{0.8}Ti_{1.2}Fe_{0.8}O_4 \cdot H_2O$, all having a layer charge-density of 2-4 nm$^{-2}$, as catalyst.

Those titanates in Table 1 with values for layer charge-density>4 nm$^{-2}$, are similar to materials such as $Na_2Ti_3O_7$ and $H_2Ti_3O_7$, $H_2Ti_4O_9 \cdot 1.2H_2O$, and $H_2Ti_5O_{11} \cdot 3H_2O$. These can be used in the process of the invention, but have to be pre-exfoliated.

Said nano-layered titanates show high activity as catalyst, resulting in short polycondensation times and increased solid state polycondensation rate in the process of the invention, minimising amount of side reactions. These titanate catalysts show little sensitivity to deactivation by moisture in the reaction medium (unlike organic titanates, and other organometallic titanium compounds), do not cause haze (unlike organic titanates), and reaction rate responds to the amount of Ti (meaning productivity can be increased to above that of standard antimony catalysts). Further, the use of recycled ethylene glycol in PET polymerisation does not deactivate this titanate catalyst nor does it introduce haze in the polymer.

The nano-layered titanates can be typically synthesized from $TiO_2$ according to known procedures, starting from conventional rutile or anatase $TiO_2$ powder, preferably micronsized powder. The nano-layered titanate has a platy appearance, with the dimensions of the plate face being in the range from 0.8 to 6 μm, and the product if synthesized correctly will be a free flowing powder. The thickness dimension of as-synthesized, non-exfoliated titanate platelet is typically less than 1 micron, e.g. 100-900 nm.

Any method known in the art can be used for the preparation and optionally exfoliation of these nano-layered titanate materials. For instance, document U.S. Pat. No. 6,838,160; T. Sasaki et al. in J. Am. Chem. Soc. 1996, 118, 8329-8335; T. Sasaki et al. in J. Chem. Soc., Chem. Commun 1991, 817-818; and T. Sasaki et al. in Chem. Mater. 1995, 7, 1001-1007 disclose that titanium oxides like lepidocrocite-type ($Cs_xTi_{2-x/4}O_4$, with $0.5 \le x \le 1$; $A_xTi_{2-x/3}Li_{x/3}O_4$, with A=K, Rb or Cs and $0.5 \le x \le 1$) can be made by a solid-state synthesis wherein $TiO_2$ is reacted with an alkali metal carbonate, to form the corresponding alkali metal titanate, and then converted to the protonated equivalent by acid treatment, e.g. hydrochloric acid, followed by adding an aqueous solution of e.g. a suitable amine, as exfoliating agent. The product is filtered, washed and dried, whereupon all alkali metal ions present among layers before the treatment are replaced with hydrogen ions by acid treatment, and a protonated form is obtained as a white powder after washing and drying. In the process according to present invention, the nano-layered titanates (after the protonation step) are preferably added to the other reactants at the start of the polymerisation; either as a powder or as a suspension obtained after an extra pre-treatment step of the titanate with a base to induce exfoliation. A further way of producing exfoliated nano-layered titanate materials, in particular those with relatively high layer charge-density, is through hydrothermal synthesis. The hydrothermal method combines the synthesis of the layered titanate with simultaneous exfoliation, often with scrolling of the exfoliated nanosheet into a nanotube. Depending on the reaction conditions, nanosheets, nanotubes, nano-rods and nano-ribbons can be obtained; within the context of this application together referred to as nanotubes. An example is described by Ma et al. in Chemical Physics Letters, 2003, 380, 577. In this document, hydrothermal synthesis involves reacting $TiO_2$ with 10M NaOH at 150° C., and washing with aqueous HCl, to give protonic, scrolled titanate nanotubes (consisting of H, Ti and O). Another hydrothermal synthesis procedure described by M. Wei et al. in Solid State Communications, 2005, 133, 493-497 involves reacting $TiO_2$ with $Na_2CO_3$ to form a layered sodium titanate $Na_2Ti_3O_7$; the latter was then reacted with water at 140-170° C. in an autoclave. According to Wei, the water molecules at high temperature penetrate the layers of the $Na_2Ti_3O_7$ and cause it to convert to the protonated titanate, which then exfoliate into nanosheets, and subsequently curl into nanotubes. Such titanate nanotubes may be filtered, washed and dried, and then added to the polyester reactants, for example a PTA-EG slurry.

However, in the scrolled structure, the catalyst efficiency may be reduced, as the surface area is lower than that of a planar nanosheet, and only the Ti atoms on the outer surface of the scroll can mediate in catalysis. This is compensated by the fact that the hydrothermal synthesis uses cheaper reagents such as NaOH, hence use of higher levels of the scrolled titanate nanotubes would be economic. Further, a higher concentration (for example 1-5%) of scrolled nanotubes would not slow down the PET polycondensation reaction as much as a similar concentration of planar nanosheets. A high concentration of nanosheets could act as a barrier to the diffusion of ethylene glycol and water, which are byproducts of the polycondensation reaction; such effect has been reported with clays. Further, about 1-5 mass% of scrolled nanotubes would act as reinforcement, especially if their aspect ratio is about 100 or greater.

The amount of the nano-layered titanate as catalyst in the process of the present invention may vary within wide limits, and be in a range of from about 10 ppm to 10000 ppm of Ti, based on polyester. Preferably, the amount of said catalyst is at least 20, 30, 40, 50, or 60 ppm, to result in shorter reaction times. The titanate can be present in relatively high amounts (for instance 1-5 mass %), but it will then not only serve as catalyst but as a filler particle as well, and may affect other properties, favourably or unfavorably. For example, at high concentration of exfoliated sheets, the polycondensation speed may be reduced, probably by sheets acting as an impediment to the outward diffusion of EG produced. On the other hand, it may improve the gas barrier performance of the final polyester for the same reason. Further, higher concentrations could lead to increased yellowing. Therefore, the titanate is preferably added only as a catalyst for production efficiency reasons, its concentration preferably being at most about 250 ppm, or more preferably at most 200, 150, 100 or 90 ppm (Ti based on polyester).

The nano-layered titanate may be added by using any conventional means in the process of the present invention. The catalyst may be added before, during or after the esterification (or trans-esterification) step together with other components. Alternatively, the nano-layered titanate may be added separately from other components (if desired in the form of pre-exfoliated suspensions) and at different times before, during or after the esterification or the trans-esterification step.

The nano-layered titanate can be used as a single catalyst in the process according to the invention, or in combination with other known catalysts or catalyst components. For example, an antimony-based compound and/or a zinc compound may be further added in the process of the invention as co-catalyst. Suitable examples of antimony-based compounds include antimony oxides, acetates and glycolates; zinc compounds could be zinc acetate or zinc oxide. Preferably, antimony acetate is used in present invention. By using a co-catalyst, performance can be optimized; e.g. solid state polycondensation rate, formation of side-products, especially acetaldehyde, and yellow discoloration of the product. When used as a co-catalyst with antimony, small amounts, like 10-50, or preferably 15-25 ppm of Ti suffice to result in high reaction rates.

The process according to the present invention may further comprise a step of adding a phosphorous-based compound. Said phosphorous-based additive typically includes phosphoric acid and its derivatives, polyphosphoric acid, organophosphorous compounds, organophosphites, organophosphonates and quaternary phosphonium compounds. Suitable examples are triphenyl phosphite, triphenyl phosphine, trihexyl phosphate, triethyl phosphonoacetate, triphenyl phosphate, tributyl phosphate, triethyl phosphate and mono sodium phosphate. Preferably, phosphoric acid, triethyl phosphate or triethyl phosphonoacetate are employed in the present process. Phosphoric acid is fully acceptable in melt polycondensation with the titanate, but the SSP rate may be lowered when compared with standard antimony catalyst. Phosphoric acid is thus suitable with the titanate if a polyester, like PET, will be made exclusively by melt polycondensation. Triethyl phosphate or triethyl phosphonoacetate increase both melt and solid state polycondensation rates when used with the titanate catalyst, and hence these are more suitable and preferred for a split process.

The phosphorous compound may be added in an amount of about 10 ppm to about 150 ppm P based on the weight of the polyester. Preferably, this compound is added in an amount of about 20 ppm to about 60 ppm P based on the weight of the polyester, to result in polyester with good stability. The phosphorous compound can be added at different stages, but is typically added in the process according to the invention at the end of the esterification.

At least one suitable colour correction agent may further be added in the process of invention. Colour correction may be effected by adding a suitable colour toner package in the polymerization slurry or by adding the toner package into the melt during polymerisation or subsequent processing. Suitable colour correction agents include cobalt acetate, blue toner, violet toner, and optical brighteners. The amount of colour correction agent may vary from 1 to 25 ppm.

The esterification and polycondensation steps in the process of present invention may be conducted at temperatures known to a skilled man; for example PET esterification will be typically performed at about 230 to about 260° C., under nitrogen, and PET polycondensation may be conducted at a temperature from about 270 to about 290° C. under reduced pressure.

The polycondensation may be conducted in a split operation, for example by employing first a melt-phase polycondensation step and a subsequent solid-phase or solid-state polycondensation step (SSP).

The polycondensation reaction may be performed by any conventional route, such as solution polycondensation and melt polycondensation. Preferably, polycondensation is conducted in the melt phase under high vacuum in a batch process, until a desired intrinsic viscosity of the precursor polyester is obtained, in case of PET for example of about 0.55 to about 0.66 dL/g, preferably 0.60 to 0.65 dL/g. More preferably, polycondensation is conducted in the melt phase in a continuous process using a train of reactors in series for esterification and polycondensation. In a continuous PET process, for example, the ethylene glycol generated in the reaction can be optionally condensed and added back into the process.

After the polycondensation step, the polyester formed may be directly extruded into fibers, filaments, films or strands by employing any method known in the art, such as melt-spinning Such polyester fibers may be used as industrial fiber materials, such as fibers for clothing; fibers for interiors and bedding; high tensile strength wires such as tire cords and ropes; and civil engineering and construction materials and vehicular materials such as air bags; and also for various woven fabrics, various knitted products, nets, short fiber non-woven fabrics, long fiber non-woven fabrics and the like (in case of PET and its copolymers).

A solid-state polycondensation step may be further conducted by applying any known techniques, for example it may be performed batchwise or in a continuous operation. The precursor polyester from melt polycondensation may be granulated or pelletized in any size and shape, and—preferably after crystallizing the pellets—may be subjected to solid-state polycondensation at a temperature between the glass transition temperature and the melting point of the polymer, thereby increasing the polyester IV; in case of PET typically to a value of about 0.72 to 0.84 dL/g. The SSP may be conducted in vacuum or by passing an inert gas stream like a nitrogen stream through the bed of pellets or granules, at a temperature in a range of about 180 to 230° C. Various solid stating processes are known in the art; such processes are for instance described in U.S. Pat. Nos. 4,064,112 and 4,161,578. The polyester obtained by applying the solid-state polycondensation step is—in case of e.g. PET—particularly suited for making pressure-resistant containers, heat-resistant and alcohol-resistant containers for various kinds of beverages. For instance, the polyester obtained with the present invention may be used for producing hollow moulded articles, such as tubes, pipes, containers. Any conventional method for producing hollow articles may be used. For example, the method for producing hollow moulded articles may involve the following steps: drying by vacuum the polyester chips obtained by solid-phase polycondensation and moulding the dried chips by a moulding apparatus such as an extrusion moulding apparatus or an injection moulding apparatus, for example using blow moulding such as stretch blow moulding, direct blow moulding, or extrusion blow moulding to obtain a final hollow container.

In the process according to the invention any conventional additives may be added, such as colourants, pigments, carbon black, glass fibers, fillers, impact modifiers, antioxidants, stabilizers, flame retardants, reheat aids, and the like. Generally, each of such additives can be used in wide amounts. Preferably, the polyester contains at most 10 mass % of customary additives, preferably at most about 5 mass %.

The invention also relates to the use of inorganic nano-layered titanates, preferably those having a negative layer charge-density of from 2-4 $nm^{-2}$ and which can spontaneously exfoliate without pretreatment in the polymerisation medium, and as defined in the above as a catalyst for esterification and/or polycondensation reactions. Preferably, the invention relates to the use of said inorganic nano-layered titanates as catalyst for making polyesters, more preferably for making polyalkyleneterephthalates like PET.

The invention will now be further elucidated with the following experiments.

Test Methods

Intrinsic Viscosity

The intrinsic viscosity (IV) is a measure of the molecular weight of the polymer and is measured by dilute solution viscosimetry. All IVs were measured in a 3:2 mixture of phenol-1,2 dichlorobenzene solution, at 25° C. . Typically, about 8-10 chips were dissolved to make a solution with a concentration of about 0.5%. The IV was obtained from the measurement of relative viscosity $\eta_r$ for a single polymer concentration (0.5%) by using the Billmeyer equation (see F. W. Billmeyer, J. of Polymer Sci. 1949 IV, 83):

$$IV=[\eta]=0.25(\eta_r-1+3\ ln\ \eta_r)/c$$
(with $c$ about 0.5-0.65 $g/dL$).

Colour

The colour parameters were measured with a HunterLab ColorFlex Model No 45/0, serial No. CX 0969. Amorphous chips were used without grinding or crystallisation, in the transparent state. Generally, the changes measured could also be seen by eye. The colour of the transparent amorphous chips was categorized using the CIE tristimulus L*, a* and b* values. The L* indicates the brightness of the samples, with a high value signifying high brightness. L*=100 stands for perfectly white; L*=0 is perfectly black. The a* value indicates the green-red contrast (− value indicates greenness; + value indicates redness); the b* value indicates blue-yellow contrast (− value indicates blue; + indicates yellow).

The measurements of the colour of the SSP chips were done without grinding. The L* values after SSP are higher because of whitening caused by spherulitic crystallisation of the polymer.

Colour toning experiments were done with one of the PETs made with the nano-layered titanate, to correct the colour from the yellow tint to a more acceptable bluish tone. This was done by injection moulding transparent plaques (3 mm thick) and adding an appropriate toner package. A standard antimony polymer which had the colour toning ingredients incorporated during polymerisation was used to make a reference plaque. The relative colour tones could be gauged by eye by placing the transparent plaques on a white background like a sheet of paper. Likewise, for the measurement of L*, a* and b* values, sensible results were obtained by placing a 'white standard' plate from HunterLab (with L*=94.8, a*=−0.89 and b*=−0.03) on top of the transparent plaque.

DEG

To determine the DEG content, the PET was trans-esterified with methanol in an autoclave at 220° C. During this, the PET is depolymerised and the DEG is liberated as the diol. The liquid formed was analysed by Gas Chromatography (GC) to determine the DEG content of the polymer, after suitable calibration.

COOH End Groups

The PET was dissolved in a mixture of o-cresol and chloroform, under reflux conditions. After cooling to room temperature, the COOH end groups were determined using potentiometric titration with ethanolic KOH solution, under a nitrogen atmosphere. The results are expressed in mVal of COOH/kg of PET (milli equivalent of COOH per kg of PET).

Residual Acetaldehyde (AA) in Chips

The AA was measured by Head Space Gas Chromotography (GC), after cryogenic grinding of the polymer chips into a powder. 1 g of the powder was placed in a GC vial. The standard headspace-method for residual AA in resins was used, and involved heating the vial at 150° C. for 90 minutes, before injection in the GC column The GC was calibrated with aqueous solutions of acetaldehyde of known concentrations.

Acetaldehyde Regeneration on Melting of SSP Polymer

The AA regenerated when the SSP chips are melted is a most important property for bottle grade chips, and reflects what would happen in a preform during injection moulding. The AA generation test involved (1) powdering the SSP polymer pellets cryogenically into powder; (2) drying the powder for 55 minutes at 170° C. in a vacuum; (3) melting the dried powder in a melt viscometer at 280° C. for 4 minutes; a die insert without a hole was used, with a nitrogen blanket; (4) removing the die insert and pushing out the molten blob with a rod, into a beaker of cold water; (5) cutting and cryogenically grinding the frozen blob; (6) using 1 g of the ground extrudate powder in a gas chromatography (GC) vial and measuring AA by standard headspace GC (90 minutes at 150° C.). The above is a relative AA generation test that can distinguish between low, moderate and high AA regenerating resins.

Synthesis of Nano-Layered Titanate

Nano-layered titanate $H_{0.7}Ti_{1.825}\square_{0.175}O_4.H_2O$ ($\square$ is vacancy) was synthesized using the procedure described by Sasaki et al. [Chem. Mater. 7, 1001-1007 (1995); J. American Chemical Society, 118, 8329-8335 (1996)]. Firstly, the caesium intermediate $Cs_xTi_{2-x/4}\square_{x/4}O_4.H_2O$ (mean value x is about 0.7) was made via a solid-state synthesis, by mixing ceasium carbonate powder and micron-sized $TiO_2$ crystals in 1:5.3 molar ratio, and calcining at 800° C. for 40 hours to form caesium titanate $(Cs_xTi_{2-x/4}\square_{x/4}O_4.H_2O)$ powder. Secondly this material was protonated by acid treatment (exchange of the $Cs^+$ with the $H^+$ ion). 1 g of the $Cs_xTi_{2-x/4}\square_{x/4}O_4.H_2O$ powder was treated with 100 $cm^3$ of 1 N hydrochloric acid solution at room temperature with stirring. The solution was renewed every day for three days; the solid phase was then filtered, washed and dried to yield the protonated titanate $H_xTi_{2-x/4}\square_{x/4}O_4.H_2O$ or $H_{0.7}Ti_{1.825}\square_{0.175}O_4.H_2O$ as a free-flowing white powder, with formula weight of 170 g. In a scanning electron microscope, this powder showed as non-agglomerated plate-type crystals, with typical lateral widths of about 0.8 to 6 μm and thickness of about 700 nm; the as-synthesized crystals in the powder are not exfoliated into nano-layers, as the crystals are about 700 atomic layers thick. Unlike in the Sasaki procedure, this powder was used as such in the polymerisation by adding it to the PTA-EG slurry; that is, without further chemical treatment with tetrabutyl ammonium hydroxide.

Synthesis of Polyester
Comparative Experiment A

A conically shaped reaction vessel of 10 liters was filled with 2246 g of PTA, 41 g IPA, 1100 g EG, 1.3 g Sb-triacetate (200 ppm of Sb), and 0.2 g of phosphoric acid (23 ppm of P). The theoretical PET yield was 2645 g. Esterification was conducted at 253° C. under nitrogen atmosphere, and the water formed was collected. When the amount of water indicated the desired esterification was complete, the vessel was heated to 278° C. and pressure was reduced to 10-40 Pa. Polycondensation was considered to start when the torque of the mechanical stirrer was observed to increase, and was continued until the torque reached a value of 13.5 Nm (which would correspond to PET of IV of about 0.64 dL/g based on earlier experiments). The polycondensation time to reach a torque of 13.5 Nm for the standard antimony polymer was 105 minutes (see Table 2) and is used as the reference to compare the catalytic efficacy of the titanate. The polyester melt was then discharged by applying nitrogen pressure on the reactor, as a single strand that was quenched in a water bath and chopped into transparent pellets.

The amorphous PET chips were crystallized by heating at 170° C. for 1 hour, and then polycondensed in solid phase at 210° C. with a continuous nitrogen flow during 6 hours.

The thus obtained white pellets were analyzed as indicated above; results are collected in Table 2. The IV reached is an indication of the SSP rate for the standard antimony polymer; higher IVs reached under the same conditions would indicate a higher SSP rate, and conversely a lower IV reflects a lower SSP rate.

Comparative Experiment B

This experiment shows that conventional, micron-sized $TiO_2$ has negligible catalytic activity in PET polycondensation. The procedure of CE A was repeated, that is antimony triacetate was used as a catalyst and micron sized $TiO_2$ particles, used in the synthesis of the nano-layered titanate, were added, resulting in 1800 ppm of Ti being present. There appeared to be no effect on polycondensation time; see Table 2. Further, the PET was opaque. Similar results were obtained with lower concentrations of $TiO_2$.

When a batch was attempted with $TiO_2$, but without antimony, polycondensation was very slowly and the torque did not build up to 13.5 Nm even after 3 hours.

Examples 1-4

These experiments indicate that the nano-layered titanate $H_{0.7}Ti_{1.83}\square_{0.175}O_4 \cdot H_2O$ acts as a co-catalyst when added as a powder in the PTA-EG slurry. The procedure of CE A was repeated, except that varying amounts of the nano-layered titanate as prepared above were added, in addition to the antimony triacetate. In Exs 1-3 93, 47 and 23 ppm of Ti correspond to the addition of 0.484, 0.242 and 0.121 g of titanate powder to the reaction mixture. In Exs 1-3 phosphoric acid (PA) was used as the thermal stabiliser, but triethyl phosphate (TEP) was used as stabilizer in Ex 4. The results summarized in Table 2 clearly indicate marked reduction in melt polycondensation times, faster SSP, less DEG and COOH end-groups having formed, but a more yellow colour of the resulting PET. That is, the nano-layered titanate is acting like a co-catalyst. The SSP rate in Exs 1-3 (judged by the IV reached after SSP) is as good or better than with the standard antimony catalyst of CE A. Ex. 4 shows that if TEP is used, an even higher SSP rate is obtained as an I.V. of 0.85 dL/g is reached.

Examples 5-11

The procedure of CE A and Ex 1-4 was repeated, except that only the nano-layered titanate as prepared above was used in different amounts as catalyst (no antimony triacetate added), in combination with phosphoric acid (Ex 5-7), triethyl phosphate (TEP, Ex 8-9), or triethyl phosphonoacetate (TEPA, Ex 10). The titanate was added in the PTA-EG slurry. The results summarized in Table 2 clearly indicate that the titanate functions as an effective melt polycondensation catalyst on its own, especially at concentration of about 50-90 ppm Ti. When the titanate is used as the sole catalyst, the SSP rate is influenced by the phosphorus compound. Ex. 11 shows that when the titanate (63 ppm of Ti) is used without any phosphorus additive, the melt polycondensation rate is better than 200 ppm of Sb, but after SSP, there is hardly any IV lift; the IV rises from 0.65 dLg to 0.67 dL/g, compared with 0.79 dL/g for the standard antimony (see CE A). Addition of a P-compound results in markedly faster SSP, especially with TEP and TEPA. Exs 6 and 7 show that with phosphoric acid, the IVs attained after SSP are 0.75 and 0.73 dL/g respectively, although this is low when compared with 0.79 dL/g for the standard antimony (see CE A). However, Exs 8-10 show that TEP and in particular TEPA act as effective aids for SSP when the titanate alone is used as the catalyst; with TEPA in Ex. 10 the IV after SSP reached 0.88 dL/g compared with 0.79 dL/g for CE A. The PET formed shows less DEG and COOH end-groups, high optical clarity, but a more yellow colour than the reference PET made with a Sb-catalyst (higher b* value).

Colour Correction of Titanate Polymer

The colour of the base polymer made from the nano-layered titanate differed from the base polymer made from the standard antimony catalyst, therefore the colour of the titanate polymer was corrected with a violet toner combined with an optical brightener.

A standard antimony polymer (200 ppm Sb, but with 15 ppm Co (cobalt (II) acetate) and 1 ppm of Estofil blue toner, all included during polymerisation) was made and subjected to SSP. Transparent plaques were injection moulded from this SSP resin. The colour of the reference plaque against a white standard background, and the colour package needed to bring the titanate polymer of Ex 8 (the polymer with the strongest yellow tint, b*=13 after SSP) to a similar tint were determined The titanate resin was dried and injection moulded into plaques, with different amounts of a commercial liquid colour additive package being added. Results of colour measurements presented in Table 3 indicate that colour adjustment of this titanate-based PET is feasible. Visually, after colour toning of the titanate polymer, the plaques had an acceptable tint. The standard antimony polymer (with the usual colour correction ingredients such as cobalt acetate and blue toner) produced a plaque that had a greenish-yellow tint, which is reflected in its negative a* value and positive b* value. The plaques from the titanate polymer of Ex. 8 had a better appearance than the standard antimony polymer with the colour correction ingredients, as the yellow cast was reduced. In principle, the same colour toner package can be added in the process of the invention at the start of the polymerisation.

TABLE 3

| | Colour | | |
|---|---|---|---|
| Sample: transparent, injection moulded sheet | L* | a* | b* |
| PET with 200 ppm of Sb + 15 ppm of Co + 1 ppm of blue toner, after SSP | 84.7 | −3.1 | 11.3 |
| Titanate, Ex 8; no colour adjustment | 81.7 | −1.7 | 12.7 |
| Titanate, Ex 8; 3 ppm violet toner, 0.8 ppm optical Brightener | 77.7 | −3.1 | 6.7 |

TABLE 3-continued

| Sample: transparent, injection moulded sheet | Colour | | |
|---|---|---|---|
| | L* | a* | b* |
| Titanate, Ex 8; 4.5 ppm violet toner, 1.1 ppm optical Brightener | 76.3 | −2.8 | 4.4 |
| Titanate, Ex 8; 6 ppm violet toner, 1.5 ppm optical Brightener | 74.4 | −3.2 | 0.1 |

TABLE 2

| | (unit) | CE A | CE B | Ex 1 | Ex 2 | Ex 3 | Ex 4 | Ex 5 | Ex 6 | Ex 7 | Ex 8 | Ex 9 | Ex 10 | Ex 11 |
|---|---|---|---|---|---|---|---|---|---|---|---|---|---|---|
| polymerisation | | | | | | | | | | | | | | |
| Sb-content | (ppm) | 200 | 200 | 200 | 200 | 200 | 200 | 0 | 0 | 0 | 0 | 0 | 0 | 0 |
| Ti-content | (ppm) | 0 | 1800 | 93 | 47 | 23 | 23 | 47 | 78 | 93 | 78 | 93 | 78 | 63 |
| P-content | (ppm) | 23 | 23 | 23 | 23 | 23 | 20 | 23 | 23 | 23 | 20 | 20 | 16 | 0 |
| P compound | | PA | PA | PA | PA | PA | TEP | PA | PA | PA | TEP | TEP | TEP A | none |
| polycondensation time | (min) | 105 | 100 | 52 | 65 | 78 | 65 | >108 | 68 | 90 | 55 | 96 | 31 | 70 |
| after melt-phase polycondensation | | | | | | | | | | | | | | |
| IV | (dL/g) | 0.67 | 0.67 | 0.65 | 0.65 | 0.66 | 0.61 | | 0.67 | 0.68 | 0.63 | 0.66 | 0.66 | 0.65 |
| COOH | (mVal/kg) | 46.2 | | 25.6 | 34.2 | 32.6 | nd | | 29.4 | 29.3 | nd | 30.1 | nd | nd |
| DEG | (wt %) | 3.0 | | 1.9 | 2.0 | 2.3 | 2.7 | | 1.5 | 1.8 | 2.1 | 1.8 | 2.4 | 2.2 |
| L* | | 67.2 | | 71.5 | 73.0 | 70.5 | 62.5 | | 69.5 | 72.9 | 68.1 | 70.6 | 68.8 | 65.4 |
| a* | | −1.5 | | −2.0 | −1.3 | −1.3 | −2.6 | | −0.7 | −1.4 | −2.6 | −0.6 | −1.8 | −2.2 |
| b* | | 4.1 | | 9.5 | 5.2 | 5.8 | 12.9 | | 10.4 | 11.3 | 18.2 | 10.3 | 14.4 | 15.5 |
| after solid-phase polycondensation | | | | | | | | | | | | | | |
| IV | (dL/g) | 0.79 | | 0.83 | 0.79 | 0.83 | 0.85 | | 0.75 | 0.73 | 0.86 | 0.81 | 0.88 | 0.67 |
| COOH | (mVal/kg) | 42.6 | | 29.0 | 34.6 | 34.3 | nd | | 42.6 | 29.9 | 29.2 | nd | 30.0 | nd |
| residual AA | (ppm) | 4.6 | | <1 | <1 | <1 | <1 | | <1 | <1 | 1.2 | <1 | <1 | <1 |
| L* | | 87.6 | | 87.6 | 90.4 | 89.1 | 85.5 | | 86.9 | 88.1 | 89.4 | 86.5 | 91.2 | 85.3 |
| a* | | −1.3 | | −1.3 | −0.9 | −0.8 | −2.2 | | −0.1 | −0.6 | −0.7 | 0.1 | −0.6 | 1.4 |
| b* | | 4.6 | | 7.6 | 5.1 | 6.2 | 10.0 | | 8.5 | 8.7 | 13.0 | 9.1 | 11.0 | 11.1 |
| AA regeneration | (ppm) | 12.1 | | 8.8 | nd | nd | nd | | 11.0 | 10.5 | nd | nd | nd | nd |

The invention claimed is:

1. A process for making a thermoplastic polyester, which comprises contacting at least one carboxylic acid-based compound and at least one alcohol-based compound in esterification and subsequent polycondensation reactions, in the presence of an inorganic nano-layered titanate in exfoliated form as a catalyst.

2. The process according to claim 1, wherein the inorganic nano-layered titanate is present in pre-exfoliated form.

3. The process according to claim 2, wherein the titanate has been added in the form of an aqueous suspension.

4. The process according to claim 2, wherein the titanate has been added as dried or semi-wet titanate nanotubes.

5. The process according to claim 1, wherein the titanate has a layer charge-density in the range of 2 to 4 nm$^{-2}$, as determined by the Sasaki method.

6. The process according to claim 1, wherein the inorganic nano-layered titanate is at least one member selected from the group consisting of titanates with lepidocrocite structure of formula $H_xTi_{2-x/4}\square_{x/4}O_4 \cdot H_2O$ wherein x is in the range of 0.5 to 1.2 and $\square$ is a vacancy at a titanium site.

7. The process according to claim 6, wherein x is in the range of 0.67 to 0.73.

8. The process according to claim 1, wherein the titanate is at least one member selected from the group consisting of $H_{0.7}Ti_{1.825}\square_{0.175}O_4 \cdot H_2O$, $H_{0.7}Ti_{1.65}Mg_{0.35}O_4 \cdot yH_2O$, $H_{0.8}Ti_{1.6}Ni_{0.4}O_4 \cdot H_2O$ and $H_{0.8}Ti_{1.2}Fe_{0.8}O_4 \cdot H_2O$.

9. The process according to claim 1, wherein the titanate plate size is in a range of 0.8 to 6 μm and thickness dimension is 100-900 nm.

10. The process according to claim 1, wherein Ti is present in an amount of 40 to 150 ppm based on the polyester.

11. The process according to claim 1, further comprising an antimony compound as co-catalyst.

12. The process according to claim 1, further comprising a phosphorous compound as stabilizer.

13. The process of claim 12, wherein the phosphorous compound is at least one selected from phosphoric acid, triethyl phosphate and triethyl phosphonoacetate.

14. The process according to claim 1, wherein the polyester is polyethylene terephthalate, the dicarboxylic acid is terephthalic acid and the diol is ethylene glycol.

15. A method of using an inorganic nano-layered titanate, comprising: contacting the inorganic nano-layered titanate with reactants in esterification and polycondensation reactions to produce a product, wherein the inorganic nano-layered titanate is in exfoliated form as a catalyst.

16. A process for making a thermoplastic polyester, which comprises contacting at least one carboxylic acid-based compound and at least one alcohol-based compound in esterification and subsequent polycondensation reactions, in the presence of an inorganic nano-layered titanate in exfoliated form as a catalyst;
  wherein the titanate has a layer charge-density in the range of 2 to 4 nm$^{-2}$, as determined by the Sasaki method; and
  wherein the inorganic nano-layered titanate is at least one member selected from the group consisting of titanates with lepidocrocite structure of formula $H_xTi_{2-x/4}\square_{x/4}O_4 \cdot H_2O$ wherein x is in the range of 0.5 to 1.2 and $\square$ is a vacancy at a titanium site.

17. A method of using an inorganic nano-layered titanate, comprising: contacting the inorganic nano-layered titanate with reactants in esterification and polycondensation reactions to produce a product, wherein the inorganic nano-layered titanate is in exfoliated form as a catalyst;
  wherein the titanate has a layer charge-density in the range of 2 to 4 nm$^{-2}$, as determined by the Sasaki method; and
  wherein the inorganic nano-layered titanate is at least one member selected from the group consisting of titanates with lepidocrocite structure of formula $H_xTi_{2-x/4}\square_{x/4}$ $O_4 \cdot H_2O$ wherein x is in the range of 0.5 to 1.2 and □ is a vacancy at a titanium site.

* * * * *